United States Patent

Kuthyar et al.

[11] Patent Number: 5,909,431
[45] Date of Patent: Jun. 1, 1999

[54] PACKET MODE MULTIMEDIA CONFERENCING SERVICES OVER AN ISDN WIDE AREA NETWORK

[75] Inventors: Ashok K. Kuthyar, Holmdel; Ram S. Ramamurthy, Manalapan; Radhika R. Roy, Howell, all of N.J.

[73] Assignee: AT&T Corp., Middletown, N.J.

[21] Appl. No.: 08/672,841

[22] Filed: Jun. 28, 1996

[51] Int. Cl.⁶ .......................... H04L 12/16; H04Q 11/00
[52] U.S. Cl. ............................................................ 370/260
[58] Field of Search ..................................... 370/260, 261, 370/264, 263, 265, 401, 402, 501, 509, 510–516; 379/202, 203, 204; 455/416; 375/354, 362–366, 376, 375

[56] References Cited

U.S. PATENT DOCUMENTS

| | | |
|---|---|---|
| 4,866,704 | 9/1989 | Bergman . |
| 5,208,811 | 5/1993 | Kashio et al. ......................... 370/264 |
| 5,384,835 | 1/1995 | Wheeler . |
| 5,444,703 | 8/1995 | Gagliardi et al. ...................... 370/395 |
| 5,560,038 | 9/1996 | Haddock ................................. 395/800 |
| 5,617,539 | 4/1997 | Ludwig et al. .................... 395/200.02 |
| 5,682,384 | 10/1997 | Zarros ..................................... 370/394 |

Primary Examiner—Ajit Patel

[57] ABSTRACT

Real-time multimedia services are transmitted over a hybrid network including a nonguaranteed quality of service packet switched local area network and a circuit switched ISDN wide area network having a centralized multimedia bridge located within the wide area network. The local area networks and multimedia bridge are interconnected via ISDN routers. An algorithm executed by the multimedia bridge receives signals from the packet switched network and detects the absence of properties needed for real-time audio visual services. The data signals are processed to compensate for the absence of the properties and then are transmitted over the wide area network to enable real-time audio visual services.

28 Claims, 8 Drawing Sheets

PACKET MODE MULTIMEDIA CONFERENCING SERVICES OVER AN ISDN WIDE AREA NETWORK

TECHNICAL FIELD

This invention relates to multimedia conferencing services and more particularly relates to such services provided over multiple nonguaranteed quality of service local area networks in geographically dispersed locations interconnected by an ISDN wide area network in which bridging is performed in the ISDN network.

BACKGROUND OF THE INVENTION

Real-time multimedia services have been provided in the past by connecting signals over circuit switched networks having guaranteed quality of service. Although this approach results in reasonable quality, it is cost prohibitive for many potential users. Most offices desiring multimedia services, such as video conferencing, are served by a packet switched local area network (LAN) providing nonguaranteed quality of service. Such networks are inherently unreliable for multimedia. The multimedia packet streams coming from such networks do not have the proper sequencing. The arrival time between the packets may have significant variations known as delay jitter, and some packets may be lost. Moreover, the recovered bit streams of audio and video do not maintain required temporal relationships to insure both intramedia and intermedia synchronization so the lip-synchronization is maintained. Since the cost of installing a guaranteed quality of service network in such offices is prohibitive, the adoption of multimedia services in most offices has been severely restricted.

One attempt to provide video and audio services is described in U.S. Pat. No. 4,866,704 (Bergman, filed Mar. 16, 1988). Bergman describes the conversion of data to T1 frames and then an additional conversion to packets for distribution on a wide band fiber optic ring. This arrangement is contrary to the existing local area network structure found in most offices, and therefore would required the installation of new networks at prohibitive expense.

Another approach to transmitting data from one location having a local area network to a second location having a local area network via a T1 network is described in U.S. Pat. No. 5,384,835 (Wheeler et al., filed Jan. 12, 1993). Wheeler et al. teach such a network arrangement for distributing text data and still graphic data. However, they do not describe any method or apparatus for providing real time video and audio over the local area and T1 networks.

SUMMARY OF THE INVENTION

My invention enables real-time multimedia conferencing services to be provided to dispersed locations interconnected by a wide area network from multimedia signals originating at the locations. The multimedia signals are audio, video or data signals, or any combination of such signals. The locations employ nonguaranteed quality of service packet switched local area networks which degrade one or more properties required by the multimedia signals. In such an environment, multimedia conferencing signals may be provided by receiving the multimedia signals from the local area networks at the wide area network, bridging the multimedia signals in the wide area network and transmitting the bridged multimedia signals over the wide area network to the various locations. By using this method, the bandwidth required to transmit the multimedia signals between the dispersed locations is reduced.

According to another aspect of my invention, the absence of the required properties is detected in the wide area network. The multimedia signals then are processed to compensate for the absence of the properties. The processed multimedia signals are transmitted to the dispersed locations over the wide area network in order to improve the multimedia services.

My invention also my be enhanced by detecting the absence of the properties in the multimedia signals at the dispersed locations and processing the multimedia signals to compensate for the absent properties.

DETAILED DESCRIPTION

Figure 1:
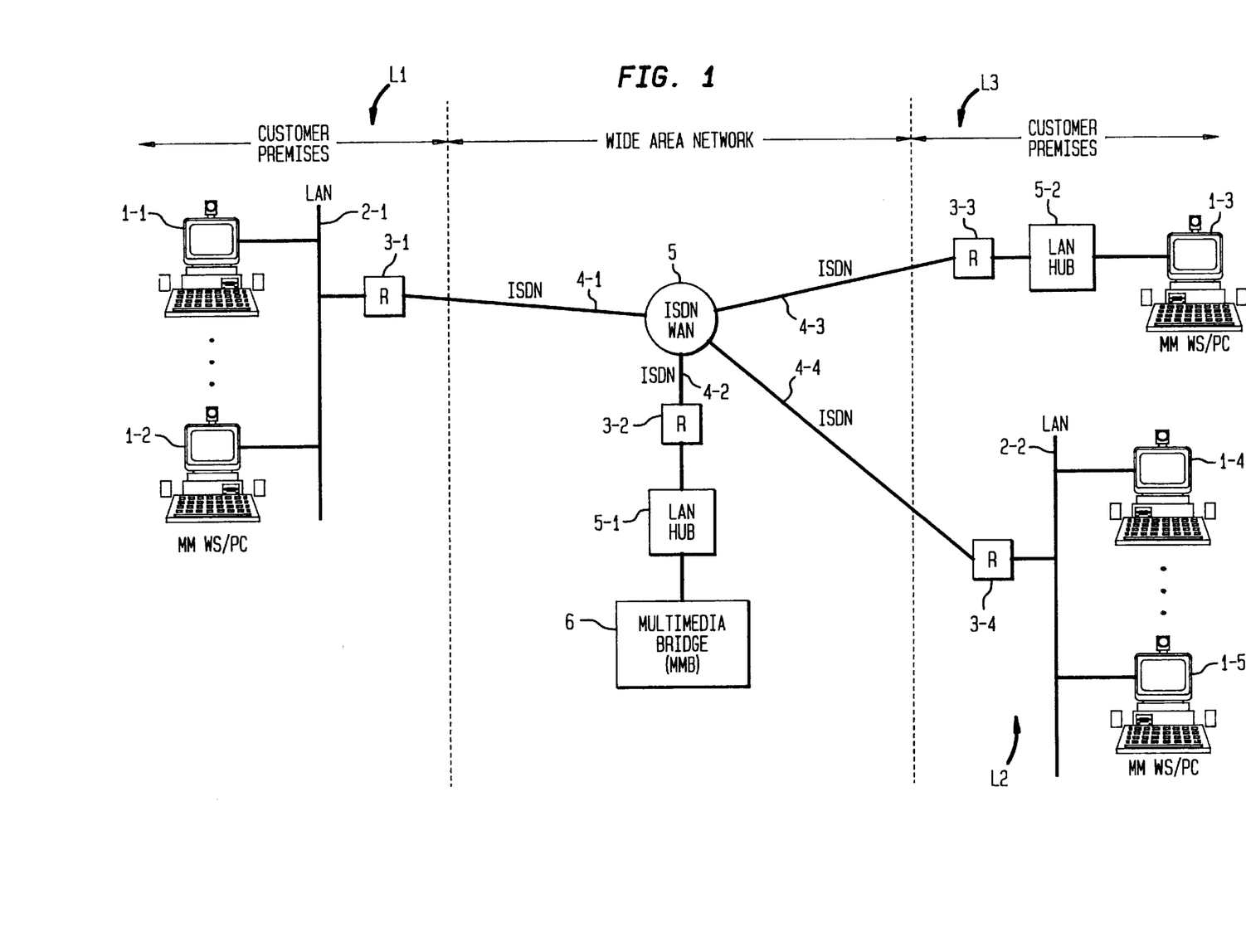
FIG. 1 illustrates a preferred form of end-to-end network configurations for multipoint multimedia conferencing services through interconnection of nonguaranteed quality of service (NGQOS) local area networks (LANs) to an integrated services digital network (ISDN) via ISDN routers in accordance with my invention.

FIG. 1 illustrates multimedia work stations or personal computers 1-1, 1-2, 1-3, 1-4 and 1-5 that are equipped with multimedia conferencing application programs based on the H.323 standard of the International Telecommunications Union (ITU). Computers 1-1 and 1-2 are connected to a shared nonguaranteed quality of service local area network 2-1 at a customer premises or location L1. Similarly, computers 1-4 and 1-5 are connected to a shared nonguaranteed quality of service local area network 2-2 located at another customer premises or location L2 which may be displaced from location L1 by many miles. Networks 2-1 and 2-2 are equipped with a gatekeeper function that controls the total loading on the network as described in ITU Rec. H.323. A conventional ISDN router 3.1 is located at location L1 for connecting signals from network 2-1 to a conventional circuit switched narrow band ISDN wide area network (WAN) 5 over a link 4-1. Signals are processed in time division multiplexing fashion over the ISDN links 4-1 through 4-4 before being transmitted over network 5. Similarly, a conventional router 3-4 at location L2 is connected to network 5 over a link 4-4. ISDN routers 3-1 and 3-4 preferably have a gatekeeper functionality.

Still referring to FIG. 1, a single multimedia workstation or personal computer 1-3 is connected to a switched local area network hub 5-2 at another customer premises or location L3 which may be displaced from locations L1 and L2 by many miles. Such an arrangement has superior performance when compared with networks 2-1 and 2-2, especially for multimedia traffic.

Networks 2-1 and 2-2, as well as hub 5-2, can be an Ethernet (IEEE 802.3), token ring (IEEE 802.5), fast Ethernet (IEEE 802.10), or FDDI (operating in the nonguaranteed quality of service mode).

Still referring to FIG. 1, a multimedia bridge 6 is connected to a dedicated high speed nonguaranteed quality of service local area network hub 5-1 that provides protocol transparency with networks 2-1, 2-2 and hub 5-2. Hub 5-1 is connected to multimedia bridge 6 to provide a guarantee of performance parameters, such as delay jitter, packet loss, error rate and delay. In a multipoint telephone call, a bad source may effect the entire conference. Bridge 6 detects the bad source and communicates with end computers 1-1, 1-2, 1-3, 1-4 and 1-5. Bridge 6 also takes specific actions agreed upon at the time of call setup. The communication messages between the computers on customer premises L1–L3 via ISDN wide area network 5 insures quality of service for multimedia conferencing.

ISDN routers 3-1, 3-2, 3-3 and 3-4 are connected to local area network 2-1, hubs 5-1 and 5-2 and local area network 2-2, respectively. The multimedia conferencing applications running on computers 1-1 through 1-5 are made in accordance with the ITU Rec. H.323 standard. ISDN routers 3-1 through 3-4 are connected to network 5 via ISDN links 4-1 through 4-4, respectively.

Multimedia bridge 6 is equipped with a multipoint control unit (MCU) functionality in accordance with the ITU Rec. H.323 standard, and has a general conference control and multipoint communication service function operating in accordance with the ITU Rec. T.120 standard, as well as a multipoint controller and multiprocessor function operating in accordance with the ITU Rec H.323 standard. Bridge 6 also has a gatekeeper function, such as address translation, admission control, bandwidth control, call control signaling, call authorization, bandwidth management, and call management as specified in the ITU Rec H.323 standard. The communication between computers 1-1 through 1-5 and the bridge 6 takes place in a master-slave relationship as described in ITU Rec H.323. Bridge 6 plays the role of the master in controlling participating computers 1-1 through 1-5.

Bridge 6 depacketizes all encapsulated packets of the multimedia bit streams of signals that originate from computers 1-1 through 1-5 and provides bridging for audio, video, and/or data. Thus, in this specification and claims, multimedia signals means audio, video or data signals, or any combination of such signals. A point-to-point call initially can be processed by bridge 6 if the end stations (i.e., computers 1-1 through 1-5) want certain services, such as directory services, admission control, or address translation at the time of call setup, while the actual bearer channel is established via an optimal path.

After the packets received from computers 1-1 through 1-5 have been depacketized, bridge 6 executes an algorithm (FIGS. 5–8) which serializes the packets, produces dummy packets for lost packets if appropriate, compensates for delay jitter where necessary and insures real-time audio and video synchronization as long as the end stations operate within certain performance guidelines. Bridge 6 then performs audio, video and data bridging in accordance with predefined schemes that are agreed upon at the time of call setup. The bridged audio, video and data bit streams again are sent to the destination end stations via ISDN routers. The ISDN routers perform IP multicasting in sending the multimedia traffic if necessary. As an alternative to IP multicasting, the ITU Rec T.125 multipoint communication service (MCS) also can be used.

Figure 2:
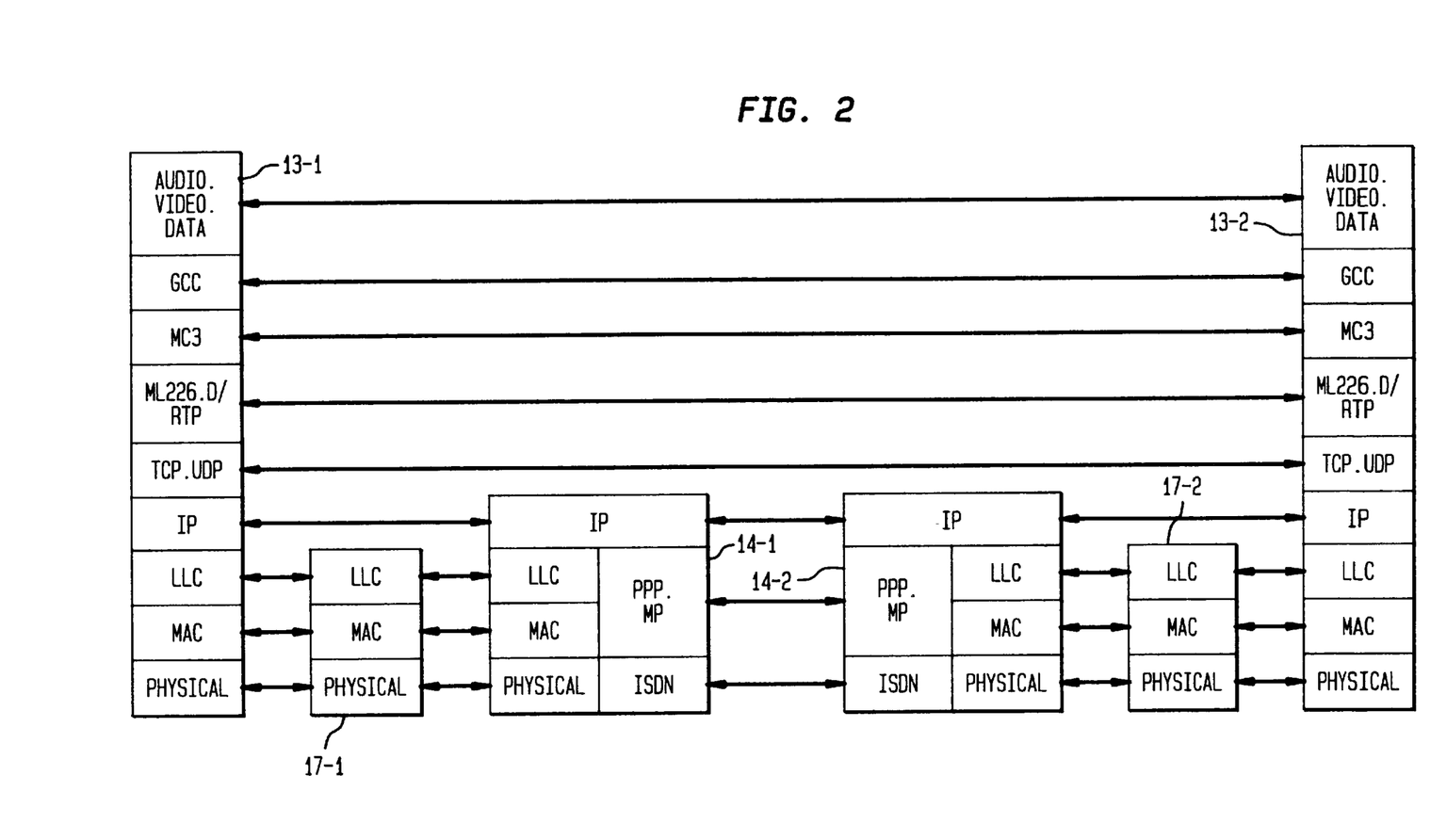
FIG. 2 depicts a preferred form of high-level end-to-end protocol architecture for the multipoint multimedia conferencing services through interconnection of the nonguaranteed quality of service (NGQOS) local area networks (LANs) to the integrated services digital network (ISDN) via ISDN routers in accordance with my invention.

The protocol architecture for end-to-end communications for multimedia conferencing involving computer 1-1 and multimedia bridge 6 is explained in connection with FIG. 2. The protocol stack 13-1 running on computer 1-1 has the entities GCC, MCS, H.225.0/RTP, TCP, UDP, IP, Logical link control (LLC), and medium access control (MAC) between the media stream (audio, video, and/or data) and a physical layer. Similarly, protocol stack 13-2 of multimedia bridge 6 has the entities GCC, MCS, H.225.0/RTP, TCP, UDP, IP, LLC, and MAC between the media stream (audio, video and/or data) and a physical layer. ISDN routers 3-1 and 3-2 communicate between computer 1-1 and bridge 6 using internet protocol (IP) (14-1, 14-2) via nonguaranteed quality of service local area network 2-1 and network hub 5-1. Network 2-1 and hub 5-1 have protocol layers LLC and MAC (17-1, 17-2). ISDN routers 3-1 and 3-2 encapsulate the IP over the point-to-point protocol (PPP or the point-to-point multipoint (MP)) to transfer audio, video and/or data over ISDN links 4-1 and 4-2 to communicate over the ISDN wide area network 5. Router 3-1 is connected to a circuit switching ISDN node of network 5.

Figure 3:
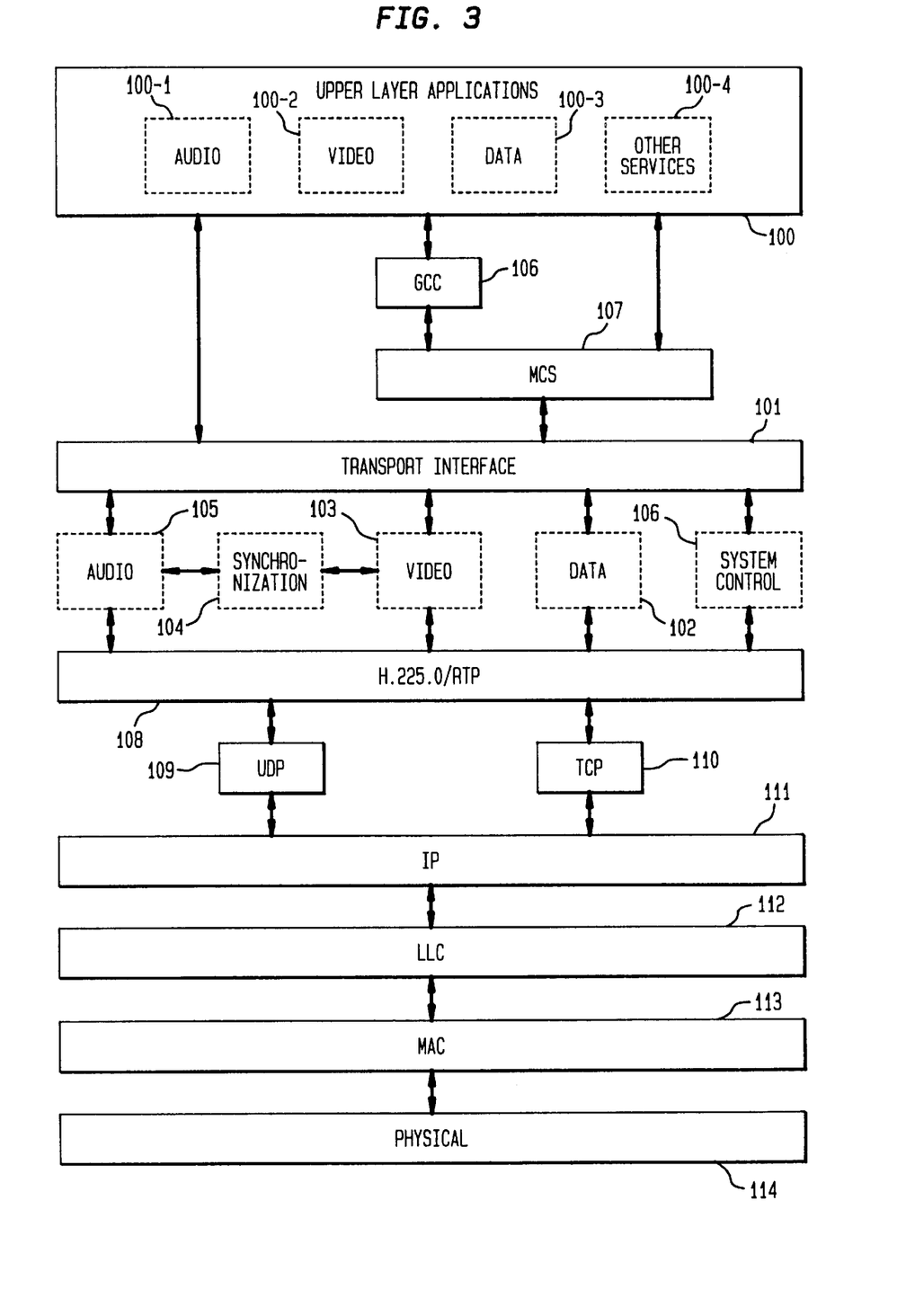
FIG. 3 shows a preferred form of nonguaranteed quality of service (NGQOS) local area networks (LANs) based multimedia workstation/personal computer (MMWS/PC) protocol architecture in accordance with my invention.

The detailed architecture of computers 1-1 through 1-5 is shown in FIG. 3. The communication between the upper layer applications 100 (e.g., audio, video, data, system control, and/or other services) and GCC 106, MCS 107, or transport interface 101 can take place directly as needed. However, GCC 106 communicates with the transport interface via MCS 107 only in accordance with the ITU Rec. T.120 standard. Transport interface 101 makes the upper layer entities transparent from the details of the lower layers. Transport interface 101 can be WinSock Forum's WINSOCK 2, Multimedia Communication Forum's (MMCF) TSI, or other interfaces.

The upper layer applications 100 may contain audio 100-1, video 100-2, data 100-3, and/or other services 100-4. Audio 105 and video 103 coming from upper layer applications 100 or lower layer entity H.225.0/RTP 108 are synchronized into an entity known as synchronization 104. Both intramedia and intermnedia synchronization services are performed by entity 104. The reference master time clock to provide synchronization is received from ISDN WAN 5 based bridge 6. The LAN based audio and video maintains synchronization by receiving clock signaling from the guaranteed quality of service ISDN WAN based bridge 6. No performance degradation occurs for any media stream when it is transferred over ISDN WAN 5. A synchronization algorithm in accordance with this invention (FIGS. 5–8) maintains synchronization for different media. Computers 1-1 through 1-5 are free to use their own synchronization methods. However, bridge 6 uses the synchronization algorithm described in connection with FIGS. 5–8.

Audio 105 and video 103 bit streams coming out of the upper layer applications are packetized in accordance with the ITU Rec. H.225.0 protocol in entity 108. H.225.0 is very similar to the IETF's RTP protocol. There can be almost direct mapping between H.225.0 and RTP. The implementation details of this mapping function are not a part of this invention. The audio and video packets encapsulated in H.225.0 are transferred using IETF's UDP protocol in entity 109. Similarly, data 102 and system control 106 traffic are encapsulated over the IETF's TCP protocol in entity 110. The system control traffic entity 106 includes control, call control, and RAS (Registration, Administration, and Status) as specified in the ITU Rec. H.245 and H.225.0 protocols. However, RAS traffic is transferred using the UDP protocol. Both UDP and TCP packets again are transferred using IEFT's IP protocol in entity 111. The IP packet is then transferred over the LAN (e.g., LAN 2-1) using the LAN protocol LLC in entity 112 and LAN protocol MAC in entity 113.

If the packets come from the LAN to the computer (e.g., LAN 2-1 to computer 1-1), a similar de-encapsulation of packets takes place from MAC in entity 113 to LLC in entity 112, from LLC in entity 112 to IP in entity 111, from IP in entity 111 to UDP in entity 109 or to TCP in entity 110, and from UDP in entity 109 to the H.225.0 protocol in entity 108. Audio 105 and video 103 bit streams are recovered from the H.225.0 protocol in entity 108. The intermedia and intramedia synchronizations are performed for the recovered bit streams in entity 104. The synchronization services in the upper layer (above the transport interface 101) can also be provided, but this service is not part of this invention.

Figure 4:
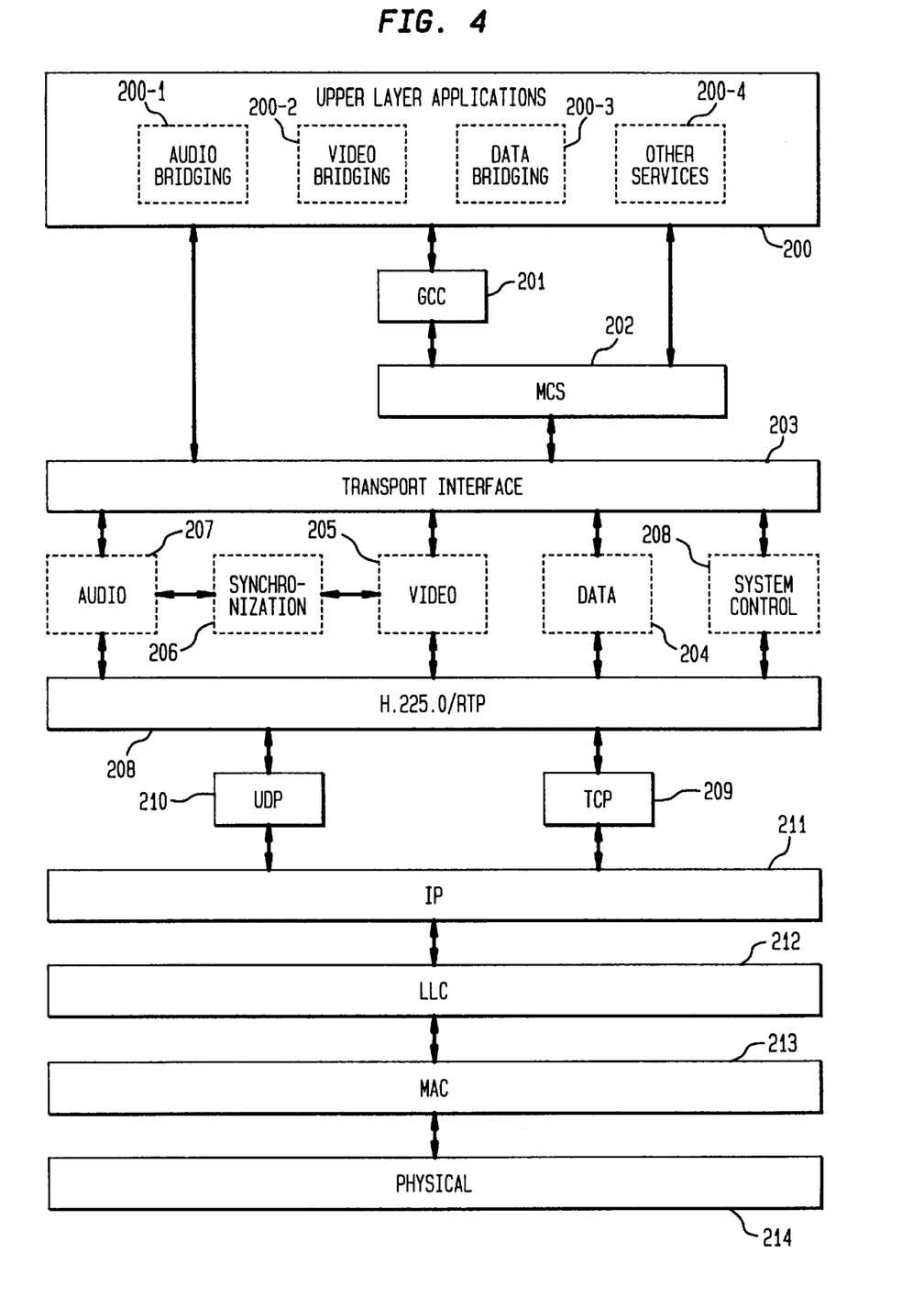
FIG. 4 shows a preferred form of switched nonguaranteed quality of service (NGQOS) local area network (LAN) hub based multipoint multimedia bridging (MMB) protocol architecture in accordance with my invention.

The protocol architecture for bridge 6 is depicted in FIG. 4. This architecture is similar to what has been shown in FIG. 3. Bridge 6 has the MCU and gatekeeper (GK) functionalities. The MCU functions of bridge 6 include bridging for audio, video and/or data similar to the functions stated for multipoint controller (MC) and multipoint processor (MP) of the ITU Rec. H.323 standard. The GK functions of bridge 6 include address translation, admission control, bandwidth control, call control signaling, call authorization, bandwidth management, call management, directory services, and others. However, bridge 6 works as the master for computers 1-1 through 1-5 connected to the LANs in the customer premises (as shown in FIG. 1) from system controlling point of view. Bridge 6 is connected to ISDN router 3-2 via a dedicated LAN hub (as shown in FIG. 1) and provides a guarantee for all performance parameters. The packets coming to bridge 6 from the LANs 2-1 and 2-2 are de-encapsulated from MAC in entity 213 to LLC in entity 212 to IP in entity 211 to UDP in entity 210 or TCP in entity 209 as explained earlier. Both intramedia and intermedia synchronization for audio 207 and video 205 streams recovered from the H.225.0 packets in entity 208 are performed in an entity known as synchronization 206. A synchronization algorithm described in FIGS. 5 through 8 improves performance specifically targeted for the real-time traffic coming out of the LANs 2-1 and 2-2 and hub 5-2. Data, system control, and other bit streams de-encapsulated from the TCP packets in entity 209 are sent to the upper layer services.

Audio 207 and video 205 bit streams then are transferred to the higher layer services to perform media bridging for audio 200-1, video 200-2, and data 200-3 bridging similar to specifications defined in the ITU Rec. H.323 standard. Every conferee sets up the communication for multipoint multimedia conferencing via bridge 6. A point-to-point communication flow is set up between bridge 6 and each end station or end system participating in the conference (e.g., computer 1-1 and 1-4). Audio bridging and video bridging are performed in entities 200-1 and 200-2 in accordance to the criteria agreed upon by the participating parties. For example, bridge 6 can provide either video switching or video mixing. Video switching is the process of selecting the video that bridge 6 outputs to computers 1-1 through 1-5 from one source to another. The criteria used to make the switch may be determined through detection of change in speaker (sensed by the associated audio level) or though control according to the H.245 standard. Video mixing is the process of formatting more than one video source into a video stream that bridge 6 outputs to computers 1-1 through 1-5. The details of the mixing criteria by the bridge 6 is not a part of this invention. Bridge 6 can prepare N audio outputs from M audio inputs by switching, mixing or a combination of these. Audio mixing requires decoding the input audio to linear signals (pulse coded modulation or analog), performing a linear combination of the signals, and recording the result to the appropriate audio format. The details of such audio mixing also are not a part of this invention. Bridge 6 processes data in accordance with the ITU Rec. T.120 standard, and has functions like GCC in entity 201 and MCS in entity 202 as shown in FIG. 4.

Figure 5:
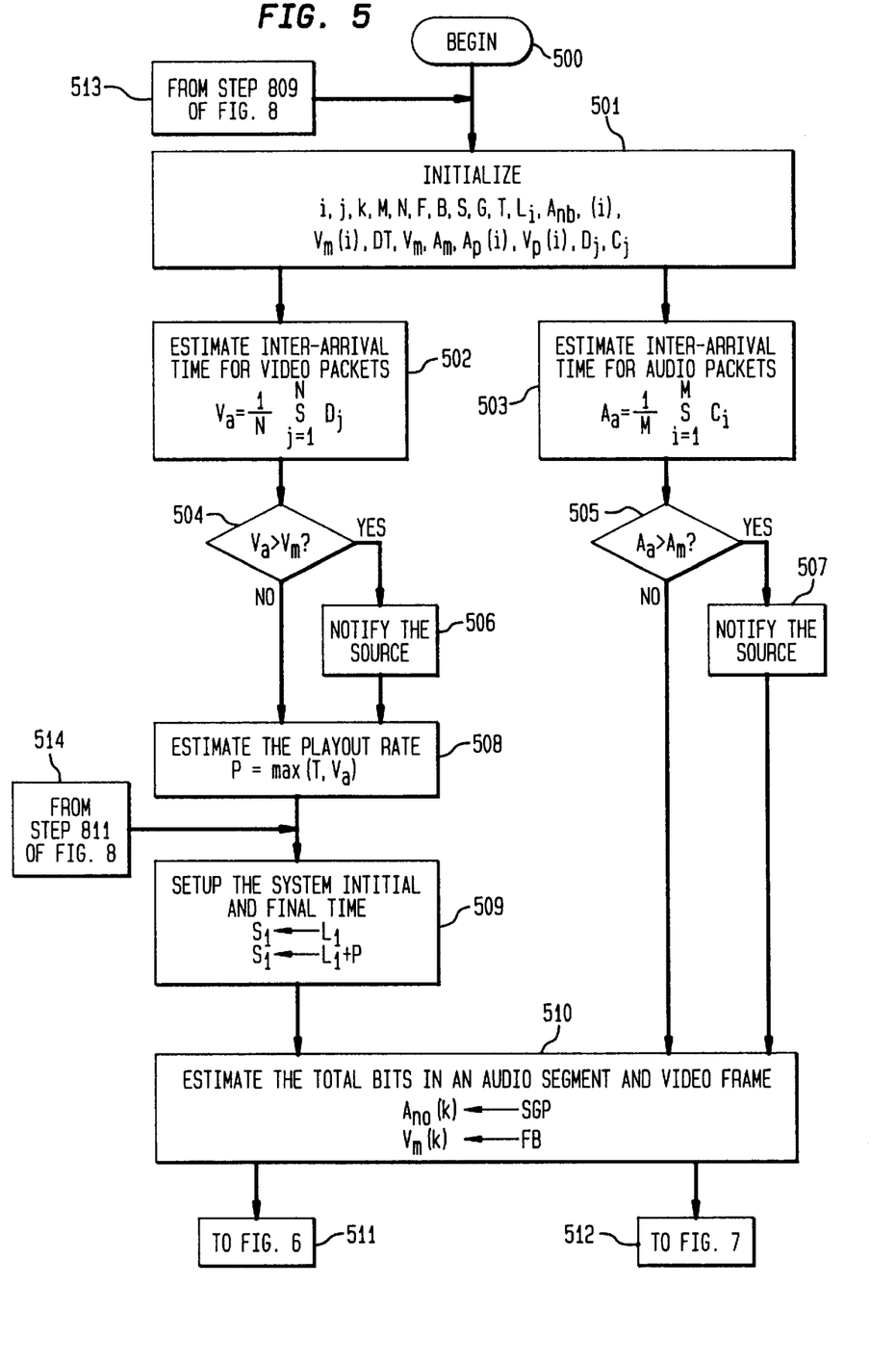
FIGS. 5 through 8 show flow charts of a preferred form of algorithm for intra and intermedia synchronization to improvement performance of the real-time audio and video traffic in accordance with my invention.

FIGS. 5 through 8 describe a preferred form of algorithm to provide intra- and inter-media synchronization to improve performance for the real-time audio and video traffic over the networks shown in FIG. 1. The algorithm detects the absence of properties needed for multimedia conferencing, such as whether appropriate audio and video packets have been received, whether such packets are synchronized, and whether a complete video frame is ready. The algorithm is executed by synchronization entity 104 of bridge 6 (FIG. 3). The process begins at step 500, while the initialization is done in step 501. The variables shown in step 501 represent the following:

i, j, k=dummy variables representing an integer number
M=Total number of audio packets in a given audio segment
N=Total number of video packets in a given video frame
F=Total number of video frames per second
B=Total number of bits per video frame
S=Total number of audio samples per second
G=Total number of bits per audio sample
T=Playout time
$L_i$=Reference clock time
$A_{sb}(k)$=Total number of bits in audio segment k
$V_{fb}(k)$=Total number of bits in video frame k
$\Delta T$=A fixed increment in playout time
$V_{th}$=A fixed threshold value for the inter-arrival time of the video packet
$A_{th}$=A fixed threshold value for the inter-arrival time of the audio packet
$A_p(i)$=Audio packet of i-th time interval
$V_p(i)$=Video packet of i-th time interval
$D_j$=Enter-arrival time of the j-th video packet
$C_i$=Inter-arrival time of the i-th audio packet
$V_a$=Average inter-arrival time for the video packet
$A_a$=Average inter-arrival time for the audio packet
$S_i$=Initial system time
$S_f$=Final system time
P=New playout time The measurement of inter-arrival time for audio and video packets for a given playout time starts at the same time in step 501. The average inter-arrival times for video and audio packets for each source are estimated as shown in steps 503 and 502, respectively:

$$V_a = (1/N) \sum_{j=1}^{N} D_j$$

$$A_a = (1/M) \sum_{i=1}^{M} C_i$$

In step 504, the average inter-arrival time of the video packet for given playout time is compared to that of the threshold value of the video packet inter-arrival time. If $V_a$ is greater than $V_{th}$, bridge 6 notifies the source as indicated in step 506. Obtaining the notification from bridge 6, the source checks whether the shared LANs, switches, ISDN routers, or the equipment are degrading the performance. The source tries to rectify the problems or accepts the degraded mode of operation. In step 505, audio packet inter-arrival time also is compared and actions similar to those described for steps 504 and 506 also are taken as stated in step 507 if $A_a$ is greater than $A_{th}$.

In step 508, the new playout time P is estimated by comparing the values of T and $V_a$. The maximum, of the two values is chosen as new playout time P. In step 509, system initial time $S_i$ is set to reference clock time $L_i$ that is being maintained by ISDN WAN 5. System final time $S_f$ is set by incrementing the system initial time by the playout interval: $S_f=S_i+P$.

In step 510, the total bits for audio segment $A_{ab}(k)$ and video frame $V_{fb}(k)$ within the given playout time are estimated: $A_{ab}(k)=SGP$ and $V_{fb}(k)=FB$. It is expected that the playout time will be very close to one video frame time. Audio and video are then processed simultaneously through a series of steps described in FIGS. 6 and 7 as indicated in steps 511 and 512, respectively.

In step 601 (FIG. 6), the algorithm examines whether all audio packets, $[A_p(i), i=1,M]$ are received within system final time, $S_f$. If all packets are not received within the scheduled playout time, dummy packets are created to replace the unreceived packets (step 602). The creation of the dummy packets minimizes errors as far as practicable. Audio segment, $A_{ab}(k)$ then is formed (step 607).

Figure 6:
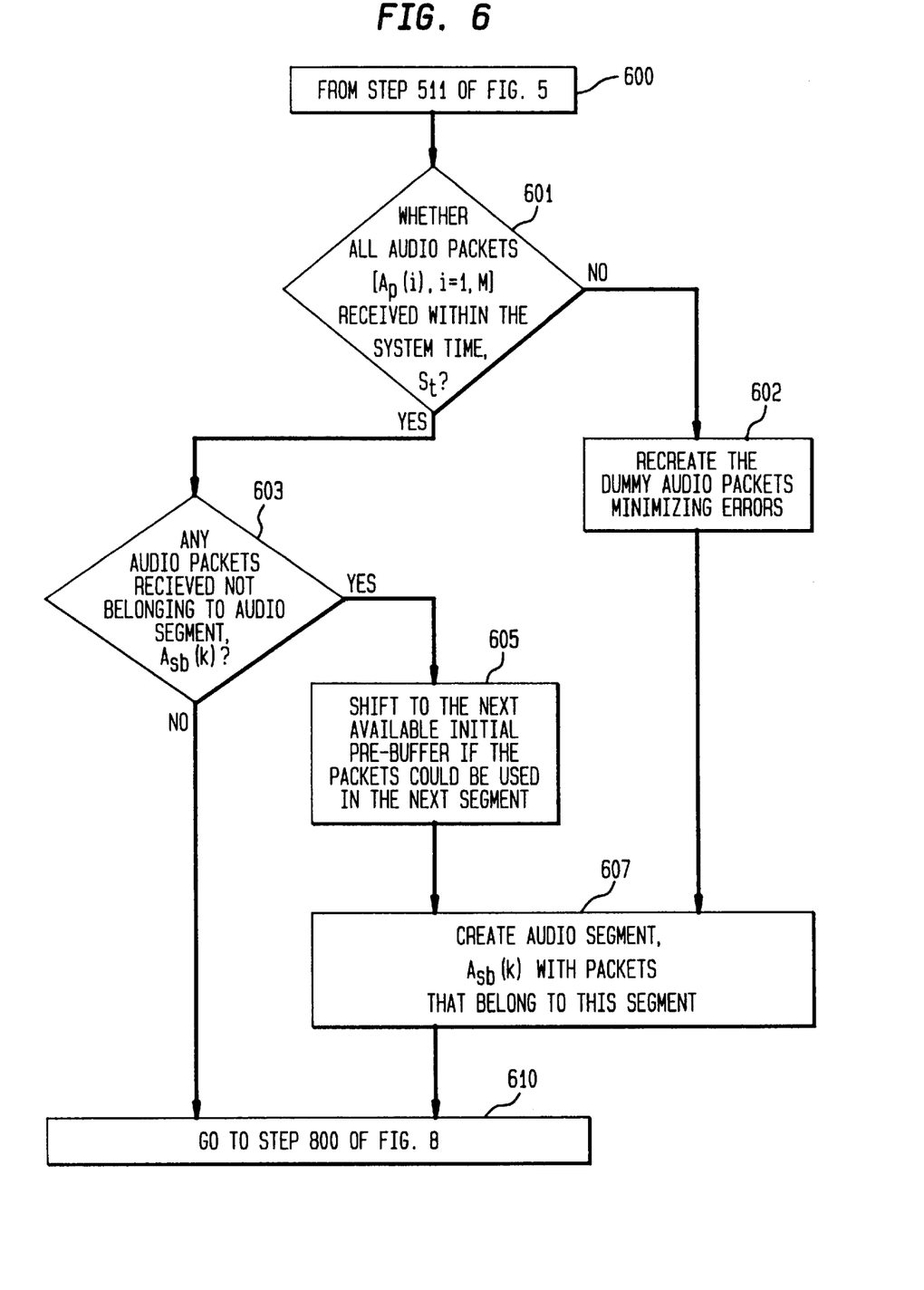
Figure 8:
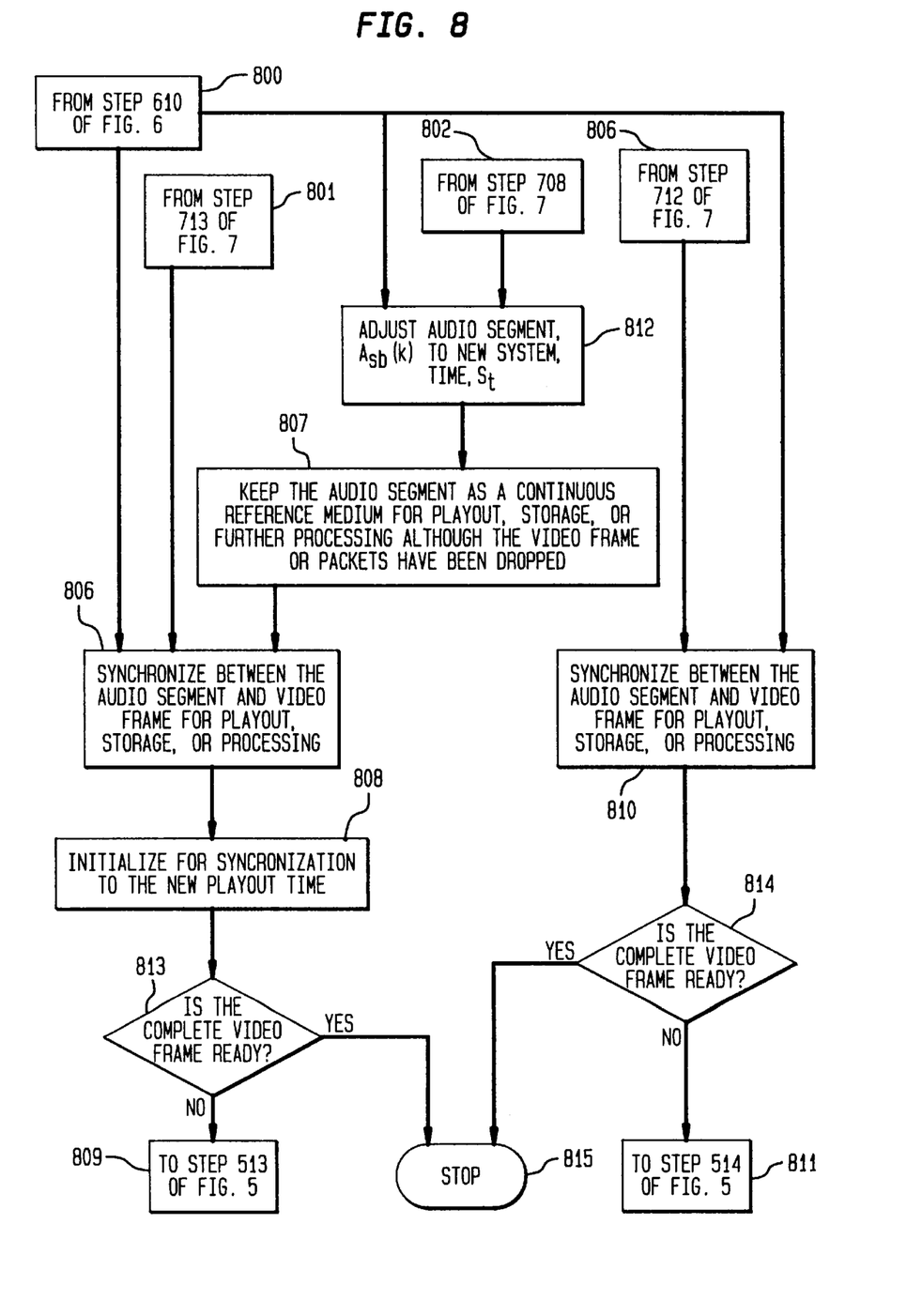

In step 603, the algorithm examines whether any audio packets received in step 601 do not belong to audio segment, $A_{ab}(k)$. The packets that do not belong to this audio segment are pre-buffered (step 605) if the packets could be used in the next segment. In step 607, audio segment $A_{ab}(k)$ is created only with those packets that belong to that segment. In step 610, the audio process, after creation of the segment, follows a series of steps as indicated in FIG. 8.

Figure 7:
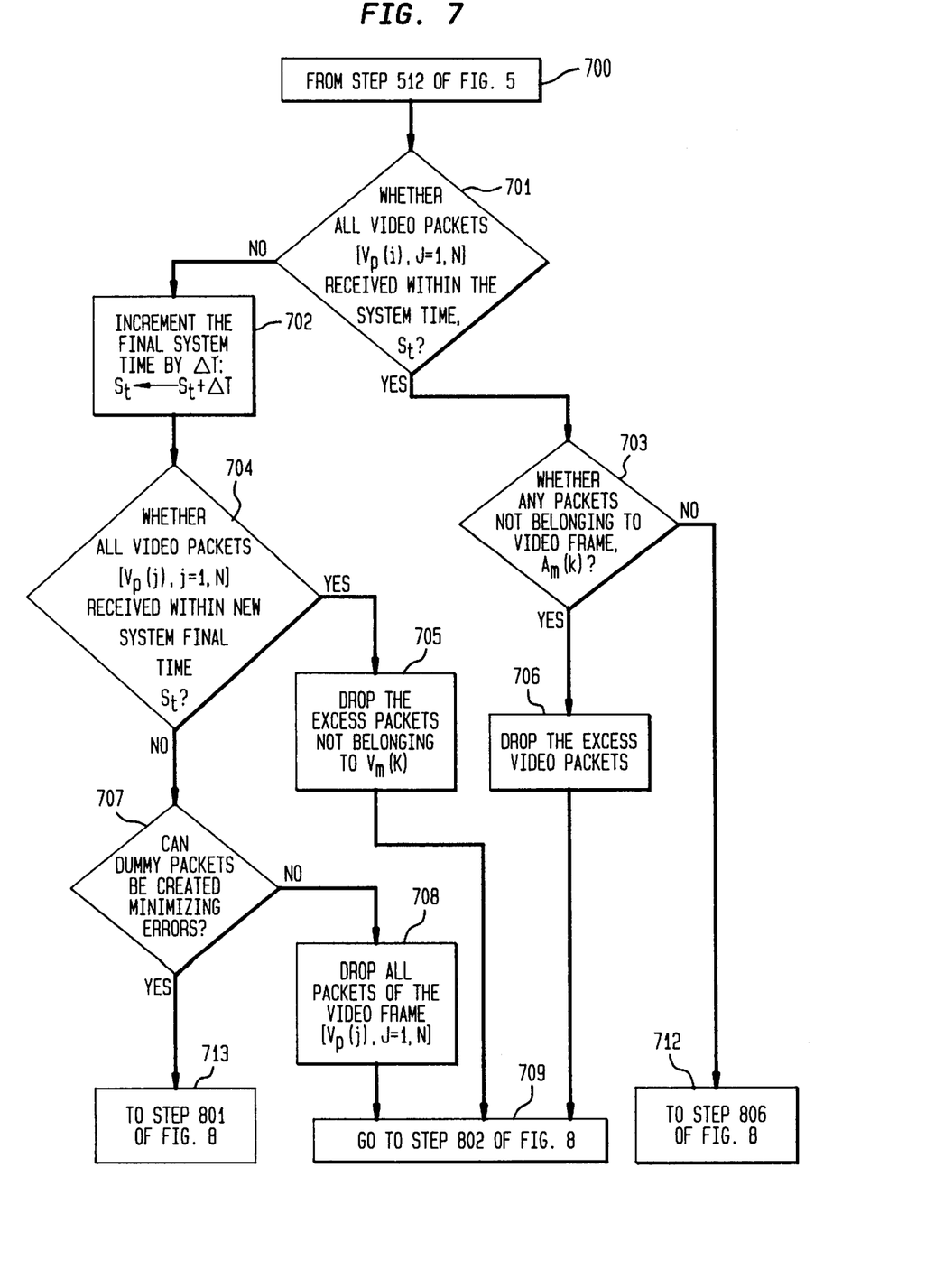

Similarly, in step 701 of FIG. 7, the algorithm examines whether all video packets, $[V_p(j), j=1,N]$ are received within system final time, $S_f$. If all packets are not received within the scheduled playout time, system final time $S_f$ is incremented by a small fraction of playout time (step 702) $\Delta T$ to set the new system final time: $S_f=S_f+\Delta T$. On the other hand, if all video packets are received within system final time $S_f$, the algorithm examines (step 703) whether any video packets not belonging to video frame $V_{fb}(k)$ are received. If no excess packets are received, the video process is sent to step 805 of FIG. 8 to follow a series of steps as indicated in step 712. However, if there are excess video packets in video frame $V_{fb}(k)$, all excess video packets are dropped (step 706), and the process is sent to step 802 of FIG. 8 as indicated in step 709.

In step 704, the algorithm again examines whether all video packets, $[V_p(j), j=1,N]$ are received within new system final time, $S_f$. If there are excess video packets in video frame, $V_{fb}(k)$ the excess video packets are dropped (step 705) and the process is then sent to step 802 of FIG. 8 as shown in step 709. If all video packets are not received within the new system final time, the process is sent to step 707.

In step 707, the algorithm examines whether dummy video packets can be created to fill up the gaps of video frame, $V_{fb}(k)$, with minimum errors. If it is possible to create video frame $V_{fb}(k)$ using dummy packets, the process is then sent to step 801 of FIG. 8 (step 713). However, all video packets $[V_p(j), j=1,N]$ of video frame $V_{fb}(k)$ are dropped (step 708), if this frame cannot be created due to non-availability of the video packets, and the process is sent to step 802 of FIG. 8 as shown in step 709.

In step 800 of FIG. 8, the audio process (from step 610 of FIG. 6) joins to the video process in step 806, 812 or 810 depending on the video events for intermedia synchronization between the audio segment and video frame for playout, storage, or processing as needed by the multimedia applications.

In step 810, a video frame (from step 712 of FIG. 7) and an audio segment (from step 610 or FIG. 6) are synchronized for playout, storage, or processing. In step 814, the algorithm examines whether the complete video frame containing the necessary video packets along with the synchronized audio segment is ready. If the video frame is ready, the process is completed (step 815); otherwise the process is repeated by going back to step 514 of FIG. 5 as indicated in step 811.

Step 802 shows that the video process received from step 708 goes to step 812, where audio segment, $A_{sb}(k)$ is adjusted to new system time $S_f$ to which a new video playout time has been set. In step 807, the audio segment is kept as a continuous reference medium for playout, storage, or processing although the video frame or packets have been dropped.

In step 806, intermedia synchronization between the audio (from step 610 of FIG. 6) and video process (either from step 713 of FIG. 7 or from step 807) are performed for playout, storage or processing, and the processes are then sent to step 808.

In step 808, the synchronization to the new playout time is initialized, since the video frame playout time has been changed from its original value. In step 813, the algorithm examines whether the complete video frame containing the necessary video packets along with the synchronized audio segment is ready. If the video frame is ready, the process is completed (step 815); otherwise the process goes to step 809 where both audio and video processes then are re-initialized, going back to step 513 (FIG. 5).

After step 815, the processed multimedia signals comprising an audio segment and video frame are transmitted to the upper layer applications. In the case of multimedia bridge 6 (FIG. 1), the audio, video and data signals are bridged in entities 200-1, 200-2, and 200-3, respectively. The bridged multimedia signals are then processed through entities like 203, 210, 209, 211, 213, and 214. Then the processed signals are transmitted through LAN hub 5-1, router 3-2 and ISDN WAN 5 as previously described. A receiving LAN, such as 2-2, processes the audio segment and video frame signals as previously described in connection with FIG. 3. If necessary, synchronization entity 104 may execute the algorithm shown in FIGS. 5–8 in order to improve performance.

In accordance with one aspect of my invention, different categories of packet mode multimedia conferencing services can be provided: premium service, semi-premium service, and non-premium service.

Referring to FIG. 1, in premium service, all conference participating end stations within a customer premises are considered to be connected to the switched nonguaranteed quality of service LANs where only the switched LAN hubs (e.g., hub 5-2) are shared. The switched LAN hubs are directly connected to an ISDN WAN router (e.g., ISDN router 3-3). The traffic and the performance characteristics within the ISDN routers will satisfy the desired requirements specified in the premium service criteria. The ISDN WAN based service provider will guarantee to maintain the superior quality of service of the packet mode multimedia conferencing services, if the shared switched hubs and ISDN routers operate within the given performance guidelines.

In semi-premium service mode, there can be a mix of switched and shared nonguaranteed quality of service LANs where the participating end stations are connected. In this mode, there can be a conditional guarantee of quality of service by the ISDN WAN based packet mode multimedia conferencing service provider.

In non-premium mode, no guarantee of the quality of service is provided by the ISDN WAN service provider. The service provider uses its best effort to provide the packet mode multimedia conferencing services.

Those skilled in the art recognize that the preferred embodiments may be altered and amended without departing from the true spirit and scope as defined in the appended claims.

We claim:

1. In a system for providing real-time multimedia conferencing services to a dispersed plurality of locations interconnected by a wide area network from multimedia signals consisting of audio, video, and data signals originating at said locations and having properties adapted for said services, said locations employing a quality of service which degrades at least one of said properties, the method comprising in combination the steps of:

receiving said multimedia signals from said locations at said wide area network;

bridging said multimedia signals in said wide area network, including detecting the degrading of at least said one property in said multimedia signals in said wide area network by estimating a first time period by which a first group of said multimedia signals is expected to be received;

determining whether any of said multimedia signals within said first group is absent at the end of said first time period;

determining whether any of said multimedia signals received within said first time period belongs to a second group different from said first group; and transmitting said bridged multimedia signals over said wide area network to said plurality of locations.

2. A method, as claimed in claim 1, wherein said step of receiving comprises the step of receiving said multimedia signals by said wide area network and wherein said wide area network comprises an ISDN network.

3. A method, as claimed in claim 2, wherein said step of transmitting comprises the step of time division multiplexing said processed multimedia signals for transmission on said ISDN network.

4. A method, as claimed in claim 1, wherein said step of processing comprises the step of deleting at least some of said multimedia signals belonging to said second group.

5. A method, as claimed in claim 1, wherein said step of processing comprises the step of storing at least some of said multimedia signals belonging to said second group.

6. A method, as claimed in claim 1, wherein said step of processing comprises the step of creating one or more dummy groups of multimedia signals for said first group in the event that multimedia signals within said first group are absent.

7. A method, as claimed in claim 1, wherein said step of processing further comprises the step of synchronizing said multimedia signals.

8. A method, as claimed in claim 1, wherein said multimedia signals comprise video signals and audio signals and wherein said step of processing comprises the step of synchronizing said video signals and said audio signals.

9. A method, as claimed in claim 1, wherein said multimedia signals comprise video signals and audio signals and wherein said step of detecting comprises the steps of:

estimating a first time period by which a first segment of said audio signals is expected to be received;

determining whether any of said audio signals within said first segment is absent at the end of said first time period;

increasing said first time period to a second time period in the event any of said audio signals is absent;

determining whether any of said audio signals within said segment is absent at the end of said second time period;

estimating a third time period by which a first frame of said video signals is expected to be received;

determining whether any of said video signals within said first frame is absent at the end of said third time period;

increasing said third time period to a fourth time period in the event any of said video signals is absent; and determining whether any of said video signals within said frame is absent at the end of said fourth time period.

10. A method, as claimed in claim 9, wherein said step of detecting further comprises the steps of:

determining whether any of said audio signals received within said first time period belong to a second segment different from said first segment;

determining whether any of said video signals received within said third time period belong to a second frame different from said first frame.

11. A method, as claimed in claim 10, wherein said step of processing comprises the steps of:

storing any of said audio signals belonging to said second segment; and storing any of said video signals belonging to said second frame.

12. A method, as claimed in claim 10, wherein said step of processing comprises the step of deleting at least some of said video signals belonging to said second frame.

13. A method, as claimed in claim 10, wherein said step of processing further comprises the step of synchronizing said audio signals within said first segment with said video signals within said first frame.

14. A method, as claimed in claim 1, and further comprising the steps of:

receiving said processed multimedia signals at one of said locations over said wide area network;

detecting the absence of at least said one property in said multimedia signals at said one location;

processing said one location multimedia signals to compensate for the absence of at least said one property; and using said processed one location multimedia signals to create audio visual services at said one location.

15. A method, as claimed in claim 14, wherein the step of detecting the absence of at least said one property in said one location multimedia signals comprises the steps of:

estimating a first time period by which a first group of said one location multimedia signals is expected to be received;

determining whether any of said one location multimedia signals within said first group is absent at the end of said first time period;

increasing said first time period to a second time period in the event any of said one location multimedia signals is absent; and determining whether any of said one location multimedia signals within said group is absent at the end of said second time period.

16. A method, as claimed in claim 15, wherein said step of detecting the absence of at least said one property in said received one location multimedia signals further comprises the step of determining whether any of said one location multimedia signals received within said first time period belong to a second group different from said first group.

17. A method, as claimed in claim 16, wherein said step of processing said one location multimedia signals comprises the step of deleting at least some of said one location multimedia signals belonging to said second group.

18. A method, as claimed in claim 16, wherein said step of processing said one location multimedia signals comprises the step of storing at least some of said one location multimedia signals belonging to said second group.

19. A method, as claimed in claim 15, wherein said step of processing said one location multimedia signals comprises the step of creating one or more dummy groups of multimedia signals for said first group of one location multimedia signals in the event that multimedia signals within said first group of one location multimedia signals is absent.

20. A method, as claimed in claim 15, wherein said step of processing said one location multimedia signals further comprises the step of synchronizing said one location multimedia signals.

21. A method, as claimed in claim 1, wherein said locations employ switched local area network hubs and further comprising the steps of:
sharing only said switched local area network hubs; and
operating said switched local area network hubs within predetermined performance guidelines, whereby superior multimedia conferencing services are provided with guaranteed quality of service parameters.

22. A method, as claimed in claim 1, wherein said locations employ a mix of shared and switched local area networks, whereby improved multimedia conferencing services are provided with conditional guarantee of quality of service parameters.

23. The system of claim 1, further including the step of compensating for said degrading of said at least one property whereby the bandwidth required to transmit said multimedia signals between said plurality of locations is reduced.

24. The system of claim 1, further including:
increasing said first time period to a second time period in the event any of said multimedia signals is absent; and
determining whether any of said multimedia signals within said group is absent at the end said second time period.

25. The system of claim 1, further including:
processing said multimedia signals to compensate for the absence of at least said one property; and
transmitting said bridged, processed multimedia signals over said wide area network to said plurality of locations, whereby the quality of said services at said plurality of locations is improved.

26. The system of claim 1 including a method for synchronizing said multimedia signals, said signals including audio, video, and data bitstream packets, the method comprising in combination the steps of:
generating an audio bitstream packet;
generating a video bitstream packet; and
clocking said audio and video bitstream packets for synchronizing same to provide an initial time and a final time for each said audio and video bitstream packets, and
establishing estimated playout times for said audio and video bitstream packets from said initial and final times.

27. The method of claim 26, wherein said step of clocking and synchronizing includes the steps of comparing the playout times estimates of said audio and video bitstream packets and attaching a delay to the bitstream packet with the earliest estimated arrival for synchronizing the bitstream packets.

28. In a system for providing real-time multimedia conferencing services to a dispersed plurality of locations interconnected by a wide area network from multimedia signals, consisting of audio, video, or data signals, originating at said locations and having properties adapted for said services, said locations employing nonguaranteed quality of service packet switched local area networks which degrade at least one of said properties, said method comprising in combination the steps of:
receiving said multimedia signals from said local area networks at said wide area network;
bridging said multimedia signals in said wide area network;
detecting the absence of at least said one property in said multimedia signals in said wide area network;
processing said multimedia signals to compensate for the absence of at least said one property; and
transmitting said bridged, processed multimedia signals over said wide area network to said plurality of locations, whereby the quality of said services at said plurality of locations is improved and the bandwidth to transmit said multimedia signals between said plurality of locations is reduced; said step of detecting comprising the steps of
estimating a first time period by which a first group of said multimedia signals is expected to be received;
determining whether any of said multimedia signals within said first group is absent at the end of said first time period;
increasing said first time period to a second time period in the event any of said multimedia signals is absent;
determining whether any of said multimedia signals within said group is absent at the end said second time period; and
determining whether any of said multimedia signals received within said first time period belong to a second group different from said first group.

* * * * *